US011001315B2

(12) United States Patent
Johnson et al.

(10) Patent No.: US 11,001,315 B2
(45) Date of Patent: May 11, 2021

(54) MOVABLE OPERATOR STATION FOR IMPROVED VISIBILITY

(71) Applicant: Caterpillar Paving Products Inc., Brooklyn Park, MN (US)

(72) Inventors: Nick Johnson, Dayton, MN (US); Ryan Hutar, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 235 days.

(21) Appl. No.: 16/140,097

(22) Filed: Sep. 24, 2018

(65) Prior Publication Data
US 2020/0094887 A1    Mar. 26, 2020

(51) Int. Cl.
| | |
|---|---|
| *B62D 33/063* | (2006.01) |
| *B60N 2/04* | (2006.01) |
| *B62D 33/073* | (2006.01) |
| *E02F 9/16* | (2006.01) |

(52) U.S. Cl.
CPC .......... *B62D 33/0636* (2013.01); *B60N 2/04* (2013.01); *B62D 33/073* (2013.01); *E02F 9/16* (2013.01); *E02F 9/166* (2013.01)

(58) Field of Classification Search
CPC .............................. E02F 9/166; B62D 33/0636
See application file for complete search history.

(56) References Cited

U.S. PATENT DOCUMENTS

| | | | | |
|---|---|---|---|---|
| 3,182,605 | A * | 5/1965 | Brasher .................. | B61C 17/04 105/342 |
| 4,026,379 | A * | 5/1977 | Dunn ..................... | B60N 2/143 180/331 |
| 4,682,666 | A * | 7/1987 | Klee .................. | B62D 33/0636 180/89.13 |
| 7,204,546 | B2 * | 4/2007 | Antonetti .......... | B62D 33/0633 180/89.13 |
| 8,136,835 | B2 * | 3/2012 | Rajasingham ......... | B60N 2/665 280/736 |
| 8,499,872 | B2 * | 8/2013 | Haubrich ................ | E02F 9/202 180/89.13 |

(Continued)

FOREIGN PATENT DOCUMENTS

| | | | |
|---|---|---|---|
| CN | 202641889 U | 1/2013 | |
| DE | 102017108377 A1 * | 10/2018 | .............. E02F 9/163 |
| WO | WO-2007074850 A1 * | 7/2007 | .............. B60N 2/502 |

*Primary Examiner* — Nicole T Verley
(74) *Attorney, Agent, or Firm* — Harrity & Harrity LLP (57) ABSTRACT

An operator station is provided. The operator station may include a platform. The platform may at least partially extend along a plane. The operator station may include a first linkage member attached to a first portion of the platform and a second linkage member attached to a second portion of the platform. The first linkage member may be pivotal with respect to a first pivot axis, and the second linkage member may be pivotal with respect to a second pivot axis. The operator station may include an actuating member attached to the first linkage member. The actuating member may actuate the first linkage member for pivoting the first linkage member in a first direction and pivoting the second linkage member in the first direction. The platform may linearly translate in the plane during pivoting of the first linkage member and the second linkage member.

20 Claims, 5 Drawing Sheets

(56) References Cited

U.S. PATENT DOCUMENTS

| | | | | |
|---|---|---|---|---|
| 8,590,983 B2* | 11/2013 | Berning | ............... | E01C 23/127 |
| | | | | 299/39.4 |
| 8,800,705 B2* | 8/2014 | Riha | ................. | B62D 33/0636 |
| | | | | 180/89.17 |
| 8,979,175 B2* | 3/2015 | Kim | ..................... | B62D 33/073 |
| | | | | 296/190.04 |
| 9,045,320 B2* | 6/2015 | Turrini | ................. | B60P 3/1091 |
| 9,181,664 B2* | 11/2015 | Berning | ............... | E01C 23/088 |
| 9,573,633 B2* | 2/2017 | Behrens | ............ | B62D 33/0636 |
| 9,783,056 B2* | 10/2017 | Klein | .................. | E01C 23/088 |
| 10,625,557 B2* | 4/2020 | Knisley | ............. | B60G 17/0162 |
| 2013/0241251 A1* | 9/2013 | Jones | ....................... | B60N 2/24 |
| | | | | 297/217.1 |
| 2020/0248431 A1* | 8/2020 | Takaoka | ................. | E02F 9/166 |

\* cited by examiner

MOVABLE OPERATOR STATION FOR IMPROVED VISIBILITY

TECHNICAL FIELD

The present disclosure relates generally to an operator station included in a machine and, more particularly, to a movable operator station included in a machine, which provides improved operator visibility.

BACKGROUND

Various types of machines used, for example, in the construction industry, include operator stations. The operator stations contain various systems and controls by which an operator can control the machine to perform an operation (e.g., a paving operation, a milling operation, and/or the like). Such operator stations are generally arranged at the rear of a machine frame, which may obstruct the operator's visibility and/or interfere with the operator's ability to oversee aspects of the operation.

One attempt at improving an operator's visibility while operating a machine is disclosed in Chinese Utility Model No. 202641889, (hereinafter, "the '889 utility model"). Per the '889 utility model, a construction machine, comprising a cab and a frame, is provided for adjusting the inclination of the cab relative to the horizontal plane. The cab can be tilted at a certain angle, which is convenient for a driver to observe and operate low-position items.

While the method disclosed by the '889 utility model addresses one method of improving operator visibility by way of tilting the cab at various angles, a need exists for more efficient control over positioning an operator station outside of machine frame for improved visibility and/or overcoming other problems in the art.

SUMMARY

According to some implementations, the present disclosure is related to an operator station. The operator station may include at least partially extending along a plane. The operator station may include a first linkage member attached to a first portion of the platform, the first linkage member being pivotal with respect to a first pivot axis that extends substantially orthogonal to the plane. The operator station may include a second linkage member attached to a second portion of the platform, the second linkage member being pivotal with respect to a second pivot axis that extends substantially orthogonal to the plane. The operator station may include an actuating member attached to the first linkage member, the actuating member being configured to actuate the first linkage member for pivoting the first linkage member in a first direction around the first pivot axis and pivoting the second linkage member in the first direction around the second pivot axis. The platform may linearly translate in the plane during pivoting of the first linkage member and the second linkage member.

According to some implementations, the present disclosure is related to a machine including an operator station. The machine may include a frame, and the operator station may be attached to the frame. The operator station may include a platform, a first linkage member having a first proximal end pivotally coupled to a portion of the frame and a first distal end coupled to a portion of the platform. The machine may include a second linkage member having a second proximal end pivotally coupled to a portion of the frame and a second distal end coupled to a portion of the platform. The machine may include an actuating member attached to the first linkage member. The actuating member may be configured to actuate the first linkage member for pivoting the first linkage member in a first direction and pivoting the second linkage member in the first direction. The platform may be configured to move in a linear direction relative to the frame during pivoting of the first linkage member and the second linkage member.

According to some implementations, the present disclosure is related to a cold planer machine including an operator station. The cold planer machine may include a frame, and the operator station may be disposed over the frame. The operator station may include a platform provided over the frame in a facing direction. The cold planer machine may include a first linkage member having a first proximal end pivotally coupled to a portion of the frame and a first distal end coupled to a portion of the platform. The cold planer machine may include a second linkage member having a second proximal end pivotally coupled to a portion of the frame and a second distal end coupled to a portion of the platform. The cold planer machine may include an actuating member attached to the first linkage member, the actuating member being configured to pivot the first linkage member and the second linkage member in a first direction during a cutting operation performed by the cold planer machine. The platform may move in a linear direction during pivoting of the first linkage member and the second linkage member in the first direction, and the platform may be maintained in the facing direction during pivoting of the first linkage member and the second linkage member in the first direction.

DETAILED DESCRIPTION

Figure 1:
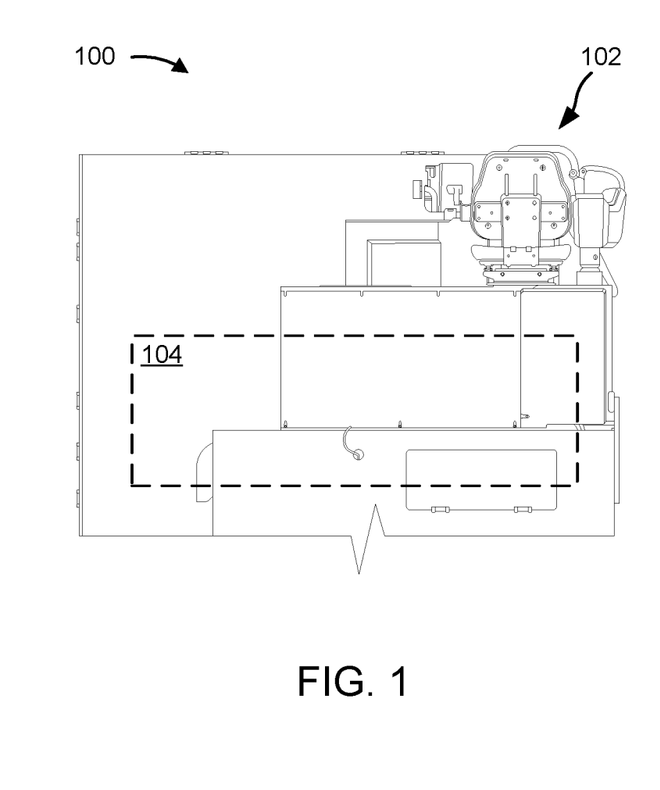
FIGS. 1 and 2 are diagrams of an example machine that includes a movable operator station.
Figure 2:
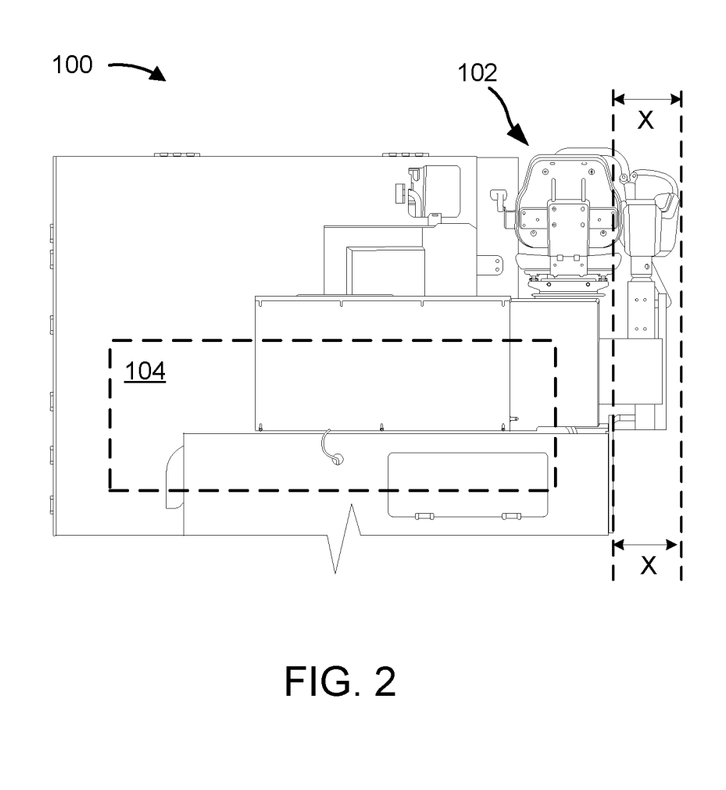

FIGS. 1 and 2 are diagrams of an example machine 100 including a movable operator station 102 and a working implement 104 (i.e., shown schematically in broken lines, as the working implement may not be visible from outside of the machine). In some implementations, machine 100 may include construction equipment used in the construction industry to perform a construction task by way of working implement 104. As an example, machine 100 may include a cold planer machine (i.e., a milling machine), a rotary mixing machine, an asphalt paving machine, and/or the like. Example working implements 104 may include a cutting drum or mill, a rotor chamber, a breaker bar, a mixing chamber, a hopper, a conveyor, a screed, and/or the like. As FIGS. 1 and 2 indicate, operator station 102 may be movable relative to machine 100 and/or working implement 104, so that an operator may be positioned outside of a machine frame (e.g., a machine body). In this way, operator visibility over a task being performed by machine 100 and/or working implement 104 may improve.

Referring to FIG. 2, and in some implementations, operator station 102 may be linearly movable relative to machine 100 and/or working implement 104. For example, operator station 102 may linearly translate relative to machine 100 and/or working implement 104, for positioning operator station 102 outside of the machine frame. In this way, machine 100 may be prevented from obstructing the view of an operator (not shown) disposed in operator station 102. In some implementations, operator station 102 may move a distance X, so that the operator disposed in operator station 102 may be positioned (e.g., via sliding, translating, swiveling, and/or the like) outside of machine 100, for improved visibility. In some implementations, the operator disposed in operator station 102 may be maintained in a forward-facing position during movement of operator station 102 in a linear direction relative to machine 100 and/or working implement 104.

In some implementations, operator station 102 may move a distance X outboard of machine 100. As an example, distance X may include a distance of at least about 25 millimeters (mm), a distance of at least about 50 mm, a distance of at least about 100 mm, a distance of at least about 200 mm, a distance of at least about 215 mm, a distance of at least about 300 mm, and/or the like. Distances X of less than about 25 mm and/or greater than about 300 mm are also contemplated.

FIGS. 1 and 2 are provided as examples. Other examples are possible and may differ from what was described in connection with FIGS. 1 and 2. In other words, machine 100, the components shown as being included in machine 100, and/or the arrangement of these components, are provided for illustrative purposes only.

Figure 3:
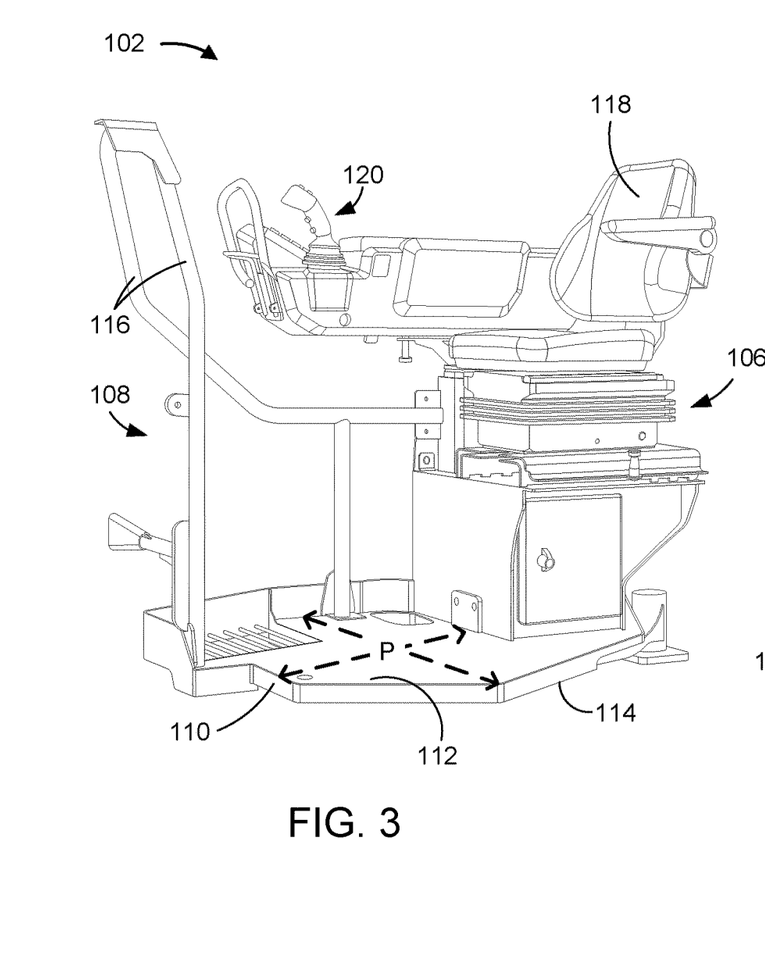
FIGS. 3 and 4 are perspective views of an example movable operator station that may be included in the machine of FIGS. 1 and 2.
Figure 4:
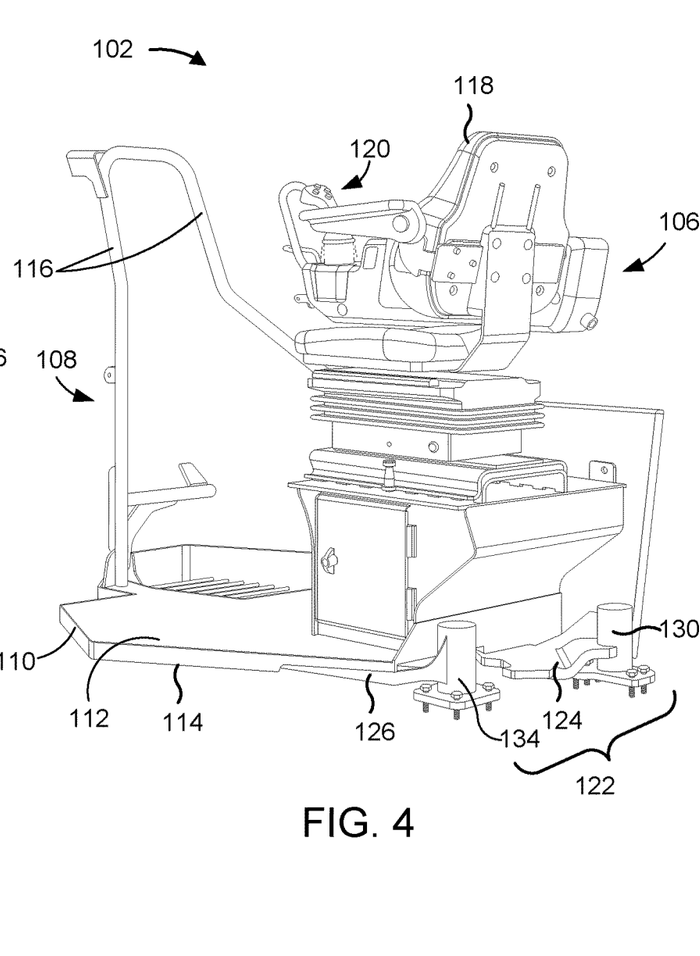

FIGS. 3 and 4 are perspective views of the example movable operator station (e.g., operator station 102) that may be included in machine 100 of FIGS. 1 and 2. For purposes of clarity, some of the components shown and described in association with FIGS. 1 and 2 may be omitted from FIGS. 3 and 4.

Referring to FIGS. 3 and 4, and in some implementations, operator station 102 may include a first end 106, a second end 108 opposite first end 106, and a platform 110 extending between first end 106 and second end 108. In some implementations, platform 110 may be provided or disposed in a plane P (e.g., schematically illustrated by broken lines), and linearly translate in and/or along plane P to move operator station 102 relative to a machine (see, e.g., machine 100, FIGS. 1 and 2). In some implementations, platform 110 may include a first surface 112 (e.g., an upper surface) and a second surface 114 (e.g., a lower surface) opposite first surface 112. The platform may be supported on or over first surface 112 of platform 110 during operation of the machine including operator station 102. One or more handrails 116 may be provided for improved stability of an operator while sitting or standing on and/or over platform 110.

In some implementations, an operator chair 118 may be provided proximate to first end 106 of operator station 102. Further, in some implementations, an operator may operate and/or control various aspects of a machine by way one or more controls disposed in an operator console area 120 of operator station 102. Such controls may be used to control (e.g., a speed, direction, and/or the like) of a working implement (e.g., working implement 104, FIG. 1), actuate the working implement, control a machine, actuate the machine, and/or the like. Such controls may additionally be used to move operator station 102 relative to the machine and/or relative to components included in and/or associated with the machine.

Referring to FIG. 4, and in some implementations, operator station 102 may include an actuating system 122. Actuating system 122 may be configured to move operator station 102 relative to a machine and/or other components (e.g., a machine frame, a working implement, and/or the like) included in and/or associated with the machine. In some implementations, actuating system 122 may be configured to move operator station 102 on or over portions of the machine by way of a four-bar linkage type of device or system, which is configured to maintain an operator, in operator station 102, in a forward-facing position during movement of operator station 102. In some implementations, actuating system 122 may be located or disposed proximate to first end 106 of operator station 102. In some implementations, some portions of actuating system 122 may be attached to operator station 102, and some other portions of actuating system 122 may be attached to a machine frame (see, e.g., machine frame 154, FIG. 7) for facilitating movement between operator station 102 and the machine frame.

Figure 5:
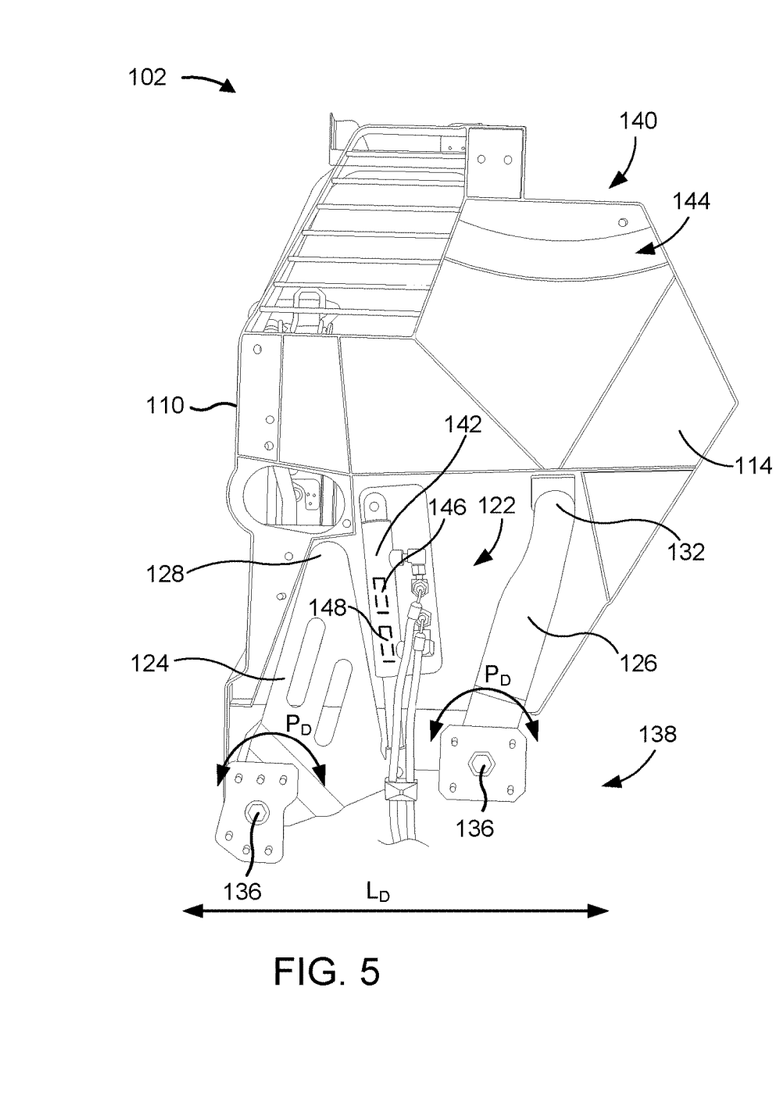
FIGS. 5 and 6 are plan views of the example operator station that may be included in the machine of FIGS. 1 and 2.

In some implementations, actuating system 122 may include at least a first linkage member 124, a second linkage member 126, and an actuating member (see, e.g., 142, FIG. 5). Respective first and second linkage members 124 and 126 may be attached to second surface 114 of platform 110 and may be actuated by the actuating member (see, e.g., actuating member 142, FIG. 5). In some implementations, first linkage member 124 may include a first proximal end (see, e.g., first proximal end 128, FIG. 5) and a first distal end 130, and second linkage member 126 may include a second proximal end (see, e.g., second proximal end 132, FIG. 5) and a second distal end 134. Actuating system 122 may be configured to move platform 110 by way of a synchronized pivoting or rotating of respective first and second distal ends 130 and 134 of respective first and second linkage members 124 and 126 on, over, and/or around one or more pins (see, e.g., pins 136, FIG. 5) attached to the machine frame as described herein.

Figure 6:
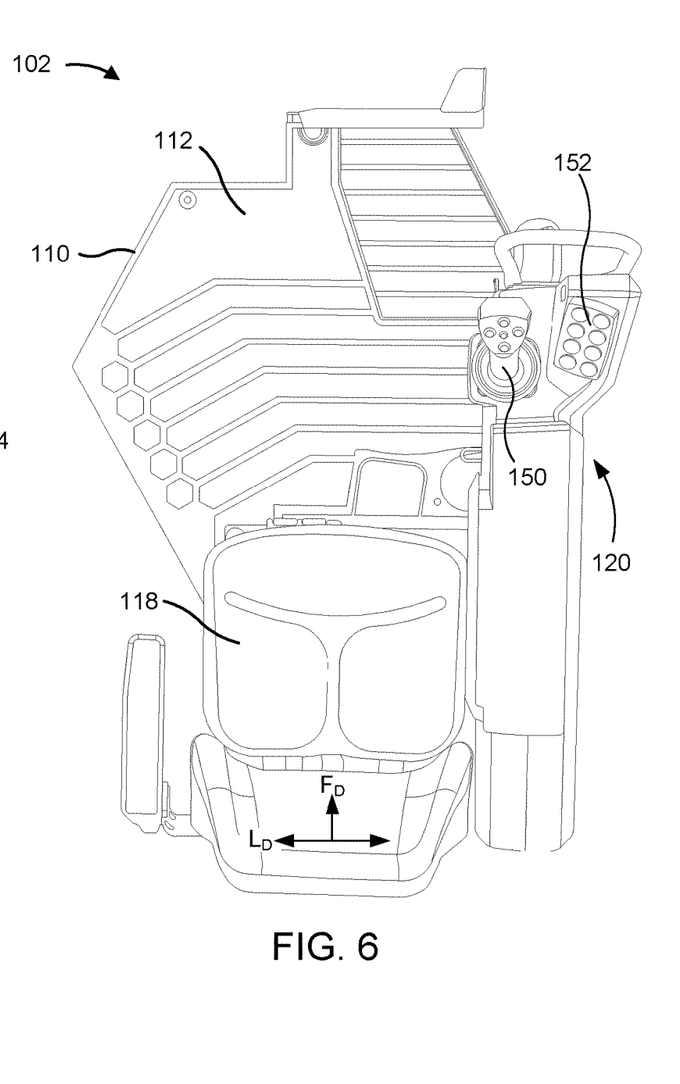

Turning now to FIGS. 5 and 6, plan views of example operator station 102 that may be included in the machine of FIGS. 1 and 2, are shown. FIG. 5 illustrates an example bottom plan view of operator station 102, including a view along second surface 114. FIG. 6 illustrates an example top plan view of operator station 102, including a view along first surface 112. For purposes of clarity, some of the components shown and described in association with FIGS. 1-4, may be omitted from FIGS. 5 and 6.

As FIG. 5 illustrates, platform 110 may include a first end 138 and a second end 140 opposite the first end 138. In some implementations, actuating system 122, including first linkage member 124, second linkage member 126, and/or an actuating member 142, may be attached to and/or disposed proximate to first end 138 of platform 110. A groove 144 may be disposed proximate to second end 140 of platform 110. In some implementations, groove 144 may be configured to receive a support member (see, e.g., support member 160, FIG. 7), which may support second end 140 of platform 110 during movement of platform 110 in and/or along a plane (e.g., plane P, FIG. 3). In some implementations, platform 110 may be configured to move in one or more linear directions $L_D$ by way of pivoting first linkage member 124 and second linkage member 126 in a same pivoting direction PD relative to one or more respective pins 136. In some implementations, first linkage member 124 and second linkage member 126, or portions thereof, may remain substantially parallel during pivoting around pins 136 to facilitate linear translation of platform 110 in or along the plane. In this way, platform 110 and/or components thereof and/or components attached thereto, may continuously face a same direction during movement of platform 110 in and/or along the plane.

In some implementations, actuating member 142 may be attached to portions of first linkage member 124. Actuating member 142 may be configured to induce pivoting of first linkage member 124 around a respective pin 136 by way of linearly extending or retracting a rod (see, e.g., 145, FIG. 7) that may be coupled to first linkage member 124. First linkage member 124 may, in turn, induce pivoting of second linkage member 126 around a respective pin 136. In some implementations, actuating member 142 may include a linear actuator or a linear actuating member, such as, for example, a hydraulic cylinder. In some implementations, actuating member 142 may include a piston 146 (e.g., shown schematically in broken lines, as the piston may not be visible from outside of the actuating member 142), for driving the rod, and a sensor device 148 (e.g., also shown schematically in broken lines, as the sensor device may not be visible from outside of the actuating member 142), which may be attached to and/or otherwise disposed proximate to piston 146. In some implementations, sensor device 148 may be configured to detect an amount of extension or retraction of piston 146, and/or the rod attached thereto, so that a distance (e.g., distance X, FIG. 2) by which platform 110 moves may be controllable based on the amount of extension or retraction of piston 146. In this way, a spatial location of platform 110 may be determined and/or controlled based on the amount of extension and/or retraction of piston 146.

Turning now to FIG. 6, and in some implementations, operator station 102 may swivel inboard and/or outboard of a machine (see, e.g., 100, FIGS. 1 and 2) during pivoting of one or more linkage members (see, e.g., 124 and 126, FIG. 5), which may collectively form a four-bar linkage system or device. In some implementations, operator station 102 and/or the components thereof (e.g., platform 110, operator chair 118, and/or the like), may be provided in a facing direction FD, and may be maintained in the facing direction FD during pivoting of the one or more linkage members. In this way, an operator may be provided and/or maintained in a desired position (e.g., a forward-facing position and/or the like) during movement of the operator station 102. In some implementations, the facing direction FD may correspond to a direction of travel of the machine to which operator station 102 is attached.

Referring to FIG. 6, and in some implementations, a first control device 150 may be provided in operator console area 120 of operator station 102. As an example, first control device 150 may include a joystick type of control device that may be communicatively coupled to one or more machine systems (e.g., a drive system, a working implement system, and/or the like) to control various aspects of the machine, such as a speed of the machine, a direction of travel of the machine, a task being performed by the machine, and/or the like. In some implementations, a second control device 152 may be provided in operator console area 120 of operator station. As an example, second control device 152 may include a push-button control device that may be communicatively coupled to actuating member 142. In this way, the push-button control device may be used to actuate, drive, instruct, and/or otherwise control actuating member 142 for moving operator station 102 inboard or outboard, relative to the machine, by way of an intuitive, operator-friendly control device.

FIGS. 3-6 are provided as examples. Other examples are possible and may differ from what was described in connection with FIGS. 3-6. In other words, operator station 102, the components shown as being included in operator station 102, and/or the arrangement of the components, are provided for illustrative purposes only.

Figure 7:
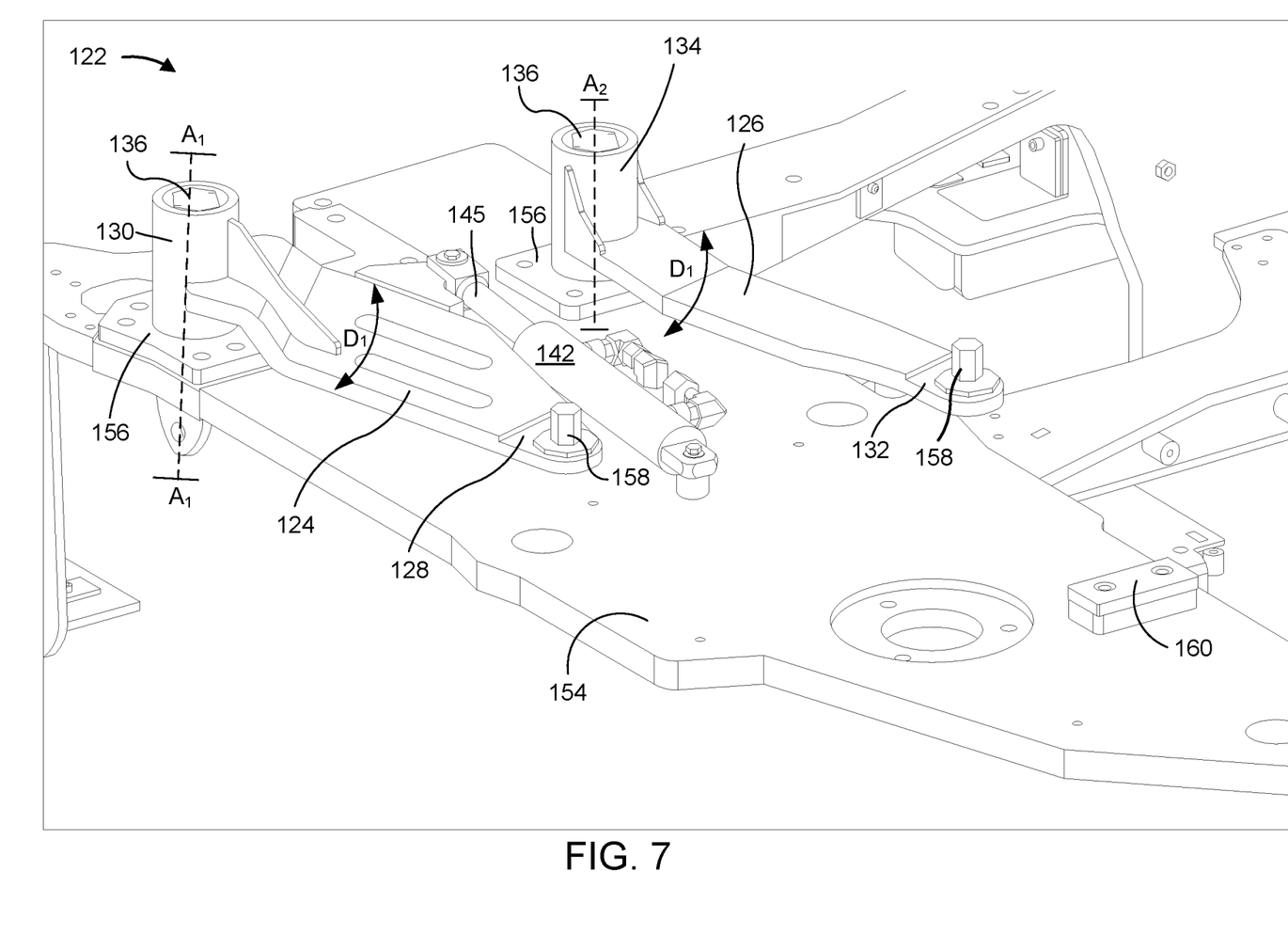
FIG. 7 is a diagram of an example actuating system associated with the example operator station that may be included in the machine of FIGS. 1 and 2.

Turning now to FIG. 7, a diagram of example actuating system 122 associated with example operator station 102 included in the machine of FIGS. 1 and 2, is shown. For purposes of clarity, some of the components shown and described in association with FIGS. 1-6 may be omitted from FIG. 7.

Referring to FIG. 7, actuating system 122 may include first linkage member 124, second linkage member 126, and actuating member 142. In some implementations, actuating system 122 may attach to portions of an operator station (see, e.g., operator station 102, FIGS. 3-6) and portions of a machine frame 154. In this way, the operator station may move relative to machine frame 154 and/or a machine to which machine frame 154 forms or connects. In some implementations, one or more mounting members 156, such as mounting plates, brackets, housings, and/or the like, may be used to attach pins 136 to machine frame 154. In this way, pins 136 may act or serve as pivot axes about which first linkage member 124 and second linkage member 126, included in actuating system 122, may pivot when actuated by actuating member 142. For example, first distal end 130 of first linkage member 124 may be disposed on, over, and/or around a respective pin 136 for sliding, swiveling, and/or otherwise pivoting in a first direction $D_1$ around a first pivot axis $A_1$ formed by the respective pin 136. Similarly, second distal end 134 of second linkage member 126 may be disposed on, over, and/or around a respective pin 136 for sliding, swiveling, or otherwise pivoting in first direction $D_1$ around a second pivot axis $A_2$ formed by the respective pin 136. In some implementations, respective first and second pivot axes $A_1$ and $A_2$ may be substantially orthogonal to a plane (see, e.g., plane P, FIG. 3) of a platform (see, e.g., 110, FIGS. 3-6) included in an operator station (see, e.g., 102, FIGS. 3-6). In some implementations, the platform and machine frame 154 may be disposed in and/or along parallel planes, so that the platform may move over machine frame 154 by way of actuating system 122.

In some implementations, actuating member 142, or a portion thereof, such as a rod 145 thereof, may extend or retract based on an amount of hydraulic pressure supplied to actuating member 142. The forces or motions associated with the extension or retraction of actuating member 142 may be imparted to first linkage member 124, for inducing movement (e.g., pivoting and/or the like) of first linkage member 124 in first direction $D_1$ and inducing movement of second linkage member 126 in first direction $D_1$. In some implementations, the platform (see, e.g., 110, FIGS. 3-6) attached to actuating system 122 may move in a linear direction during pivoting of first linkage member 124 and second linkage member 126 in first direction $D_1$.

In some implementations, actuating system 122 may connect to the platform of the operator station (see, e.g., 102, FIGS. 3-6) for moving the platform respective to machine frame 154. For example, one or more connecting members 158 may be used to connect portions of actuating system 122 to the platform of the operator station. In some implementations, first proximal end 128 of first linkage member 124 may include one or more connecting members 158 that extend between and/or connect first linkage member 124 and the platform. Similarly, second proximal end 132 of second linkage member 126 may include one or more connecting members 158 that connect second linkage member 126 to the platform. Example connecting members 158 include, without limitation, pins, rods, bars, clips, bolts, threaded connectors (e.g., screws), and/or the like. In some implementations, the platform may move in a linear direction (see, e.g., $L_D$, FIG. 6) during pivoting of first linkage member 124 and second linkage member 126 in first direction $D_1$, so that the platform may be maintained in a facing direction (see, e.g., FD, FIG. 6) during pivoting of first linkage member 124 and second linkage member 126 in first direction $D_1$.

Still referring to FIG. 7, and in some implementations, a support member 160 may be provided on or over machine frame 154 for supporting the operator station as the operator station moves relative to machine frame 154. In some implementations, support member 160 may engage a groove (see, e.g., 144, FIG. 5) of the operator station to improve the weight distribution and/or balance of the operator station as the operator station moves relative to machine frame 154. As an example, support member 160 may include and/or be at least partially formed by a material having a low resistance to movement, such as a plastic, polymeric, and/or metallic material.

FIG. 7 is provided as an example. Other examples are possible and may differ from what was described in connection with FIG. 7. In other words, actuating system 122, the components shown as being included in actuating system 122, and/or the arrangement of the components, are provided for illustrative purposes only.

Figure 8:
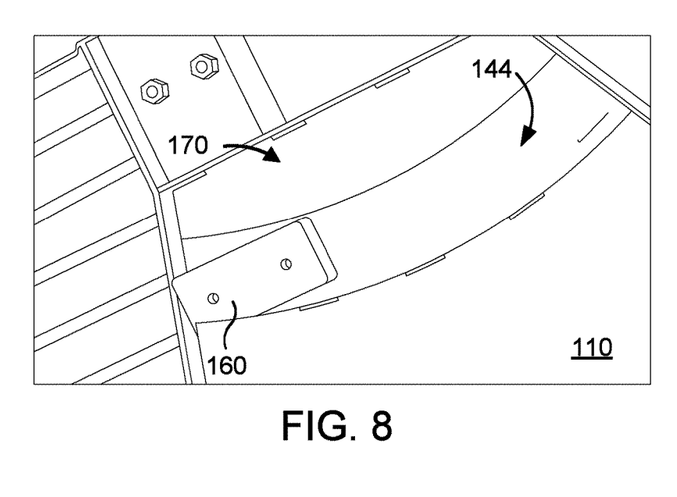
FIG. 8 is a diagram of an example support system associated with the example operator station that may be included in the machine of FIGS. 1 and 2.

FIG. 8 is a diagram of an example support system 170 associated with example operator station 102 that may be included in the machine of FIGS. 1 and 2. For purposes of clarity, some of the components shown and described in association with FIGS. 1-7 may be omitted from FIG. 8.

Referring to FIG. 8, and in some implementations, support system 170 may include groove 144 and support member 160. In some implementations, groove 144 may be provided on, over, and/or within a portion of platform 110. As an example, groove 144 may be machined in platform 110. As another example, groove 144 may be formed in an attachment member that attaches to platform 110 by way of welding, bolting, and/or the like. In some implementations, support member 160 may be provided on or over the machine frame (e.g., machine frame 154, FIG. 7) facing platform 110. As an example, support member 160 may include a support pad that attaches to the machine frame by way of welding, threading, bolting, and/or the like.

In some implementations, support member 160 may be rigidly attached to the machine frame, and move (e.g., via sliding and/or the like) within groove 144 as platform 110 moves relative the machine frame. In some implementations, groove 144 may be configured to be engage and/or retain support member 160, so that support member 160 may improve the weight distribution and/or guided movement of the operator station relative to the machine frame.

As noted above, FIG. 8 is provided as an example. Other examples are possible and may differ from what was described in connection with FIG. 8. In other words, support system 170, the components shown as being included in support system 170, and/or the arrangement of the components, are provided for illustrative purposes only.

Figure 9:
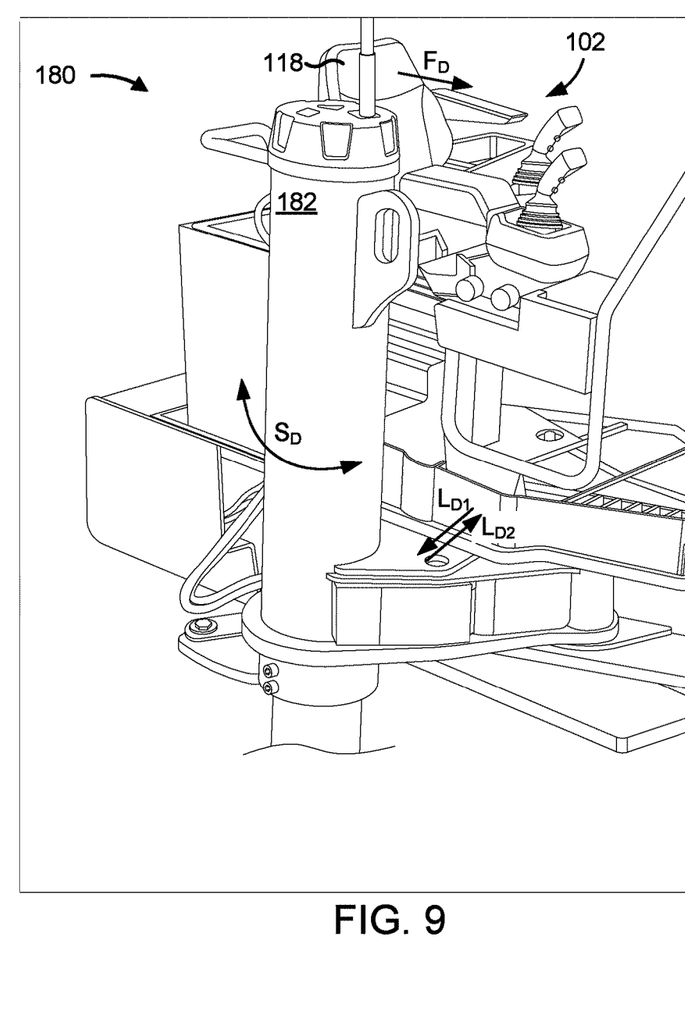
FIG. 9 is a diagram of another example machine that includes a movable operator station.

FIG. 9 is a diagram of another example machine 180 that includes a movable operator station (e.g., operator station 102). For purposes of clarity, some of the components shown and described in association with FIGS. 1-8 may be omitted from FIG. 9.

In some implementations, machine 180 may include a cold planer machine configured to remove portions of a roadway using a cutting drum or mill (not visible in this view). Machine 180 may include operator station 102 as described in FIGS. 1-8 above. In some implementations, operator station 102 and/or one or more components (e.g., operator chair 118) thereof, may be provided in a facing direction FD, and remain in the facing direction FD during movement of operator station 102 in a first linear direction $L_{D1}$ and/or a second linear direction $L_{D2}$, as described above. In this way, an operator may have improved visibility of a cutting operation being performed by machine 180.

In some implementations, machine 180 may include a leg member 182 configured to provide stability of machine 180 during a cutting process, and/or increase a cutting width associated with machine 180. In some implementations, leg member 182 may move (e.g., swivel, swing, and/or the like) in a swivel direction SD during operation of machine 180. In some implementations, leg member 182 may limit a distance by which operator station 102 may move.

As described above, and in some implementations, the spatial location and/or position of operator station 102 may be determined by way of a sensor device (e.g., sensor device 148, FIG. 5) provided in an actuating member (e.g., actuating member 142, FIG. 5) associated with operator station 102. In this way, a spatial location and/or position of platform 110 may be determined based on information (e.g., an amount of piston or rod extension, retraction, and/or the like) received from the sensor device. For example, the information received from the sensor device may be used to determine a distance that operator station 102 has moved in relation to machine 180 and/or a location of operator station 102 relative to machine 180. Such information may be used to intelligently limit the amount by which operator station 102 may extend from machine 180. In this way, operator station 102 may be prevented from moving too great a distance outside of machine 180, and be prevented from contacting leg member 182, when leg member 182 is disposed in an outboard position adjacent to operator station 102.

As indicated above, FIG. 9 is provided as an example. Other examples are possible and may differ from what was described in connection with FIG. 9. In other words, machine 180, the components shown as being included in machine 180, and the arrangement of these components, are provided for illustrative purposes only.

INDUSTRIAL APPLICABILITY

The disclosed example machines (i.e., 100, 180) and example operator station (i.e., 102) included in such machines, may incorporate an actuating system by which the operator station 102 may move relative to the machines. In this way, an operator may be positioned outside of a machine, which may improve the operator's visibility over a task being performed by the machine. Moreover, positioning the operator outside of the machine may reduce an amount of physical exertion required by the operator in obtaining a satisfactory view of the task, which may reduce operator fatigue.

Further, in some implementations, the example machines (i.e., 100, 180) and example operator station (i.e., 102) included in such machines, may incorporate a support system 170, which may improve (e.g., increase) an amount of support provided to operator station 102 during movement. In this way, operator station 102 may move more efficiently relative to the machines set forth herein.

Further, in some implementations, the example machines (i.e., 100, 180) and example operator station (i.e., 102) included in such machines, may incorporate a sensor device 148, which may provide intelligence and/or feedback used to improve the maneuverability and/or positioning of operator station 102. In this way, an amount of control associated with positioning operator station 102 outside of the machines set forth herein may be optimized and/or improved.

What is claimed is:

1. An operator station, comprising:
   a platform at least partially extending along a plane;
   a first linkage member attached to a first portion of the platform, the first linkage member being pivotal with respect to a first pivot axis that extends substantially orthogonal to the plane;
   a second linkage member attached to a second portion of the platform, the second linkage member being pivotal with respect to a second pivot axis that extends substantially orthogonal to the plane; and
   an actuating member attached to the first linkage member,
      the actuating member being configured to actuate the first linkage member for pivoting the first linkage member in a first direction around the first pivot axis and pivoting the second linkage member in the first direction around the second pivot axis,
      the platform being configured to linearly translate in the plane during pivoting of the first linkage member and the second linkage member, and
      the actuating member including:
         a piston, and
         a sensor device disposed proximate to the piston, the sensor device being configured to detect an amount of extension or retraction of the piston so that a distance by which the platform translates is controllable based on the amount of extension or retraction.

2. The operator station of claim 1, wherein the actuating member includes a hydraulic cylinder.

3. The operator station of claim 1, wherein the platform includes:
   a first end, the first linkage member and the second linkage member being attached to the first end of the platform; and
   a second end opposite the first end, a groove being provided in the second end of the platform, the groove being configured to receive a support member configured to support the second end of the platform as the platform linearly translates in the plane.

4. The operator station of claim 1, wherein the platform is configured to linearly translate in a first linear direction relative to a machine and in a second linear direction relative to the machine, and
   wherein the second linear direction is opposite from the first linear direction.

5. The operator station of claim 1, wherein the platform is configured to linearly translate a distance of at least about 25 millimeters (mm).

6. The operator station of claim 1, wherein the platform supports an operator chair provided in a facing direction, and
   wherein the operator chair is maintained in the facing direction during linear translation of the platform.

7. A machine, comprising:
   a frame;
   an operator station attached to the frame, the operator station including a platform;
   a first linkage member having a first proximal end coupled to a portion of the platform, and a first distal end pivotally coupled to a portion of the frame;
   a second linkage member having a second proximal end coupled to the portion of the platform, and a second distal end pivotally coupled to the portion of the frame; and
   an actuating member attached to the first linkage member,
      the actuating member being configured to actuate the first linkage member for pivoting the first linkage member in a first direction and pivoting the second linkage member in the first direction,
      the platform being configured to move in a linear direction relative to the frame during pivoting of the first linkage member and the second linkage member, and
      the actuating member including:
         a piston; and
         a sensor device disposed proximate to the piston, the sensor device being configured to detect an amount of extension or retraction of the piston so that a distance by which the platform moves is controllable based on the amount of extension or retraction.

8. The operator station of claim 1, wherein one or more components of the operator station are maintained in a facing direction during pivoting of the first linkage member in the first direction and pivoting of the second linkage member in the first direction, and
   wherein the facing direction corresponds to a direction of travel of a machine to which the operator station is attached.

9. The operator station of claim 1,
   wherein the operator station swivels one or more of inboard or outboard of a machine during pivoting of the first linkage member in the first direction and pivoting of the second linkage member in the first direction, and
   wherein the first linkage member and the second linkage member remain substantially parallel during pivoting of the first linkage member in the first direction and pivoting of the second linkage member in the first direction.

10. The machine of claim 7, further comprising:
    a support member provided on the frame; and
    a groove provided in the platform, the groove being configured to engage the support member for supporting the platform over the frame.

11. The machine of claim 7, wherein the platform is configured to move in the linear direction by a distance of at least about 25 millimeters (mm).

12. The machine of claim 7, wherein the actuating member includes a linear actuator.

13. The machine of claim 12, wherein the linear actuator includes:
    the piston, and
    the sensor device.

14. The machine of claim 7, further comprising a push-button control device communicatively coupled to the actuating member, the push-button control device being configured to control the actuating member for moving the platform.

15. The machine of claim 7, wherein the platform is configured to support the operator station in a facing direction, and the operator station being maintained in the facing direction during movement of the platform.

16. The machine of claim 7, wherein the machine comprises:
- a cold planer machine,
- a rotary mixing machine, or
- a paving machine.

17. A cold planer machine, comprising:
- a frame;
- an operator station disposed over the frame, the operator station including a platform being provided in a facing direction;
- a first linkage member having a first proximal end coupled to a portion of the platform, and a first distal end pivotally coupled to a portion of the frame;
- a second linkage member having a second proximal end coupled to the portion of the platform, and a second distal end pivotally coupled to the portion of the frame; and
- an actuating member attached to the first linkage member,
  - the actuating member being configured to pivot the first linkage member and the second linkage member in a first direction during a cutting operation performed by the cold planer machine,
  - the platform being configured to move in a linear direction during pivoting of the first linkage member and the second linkage member in the first direction,
  - the platform being maintained in the facing direction during pivoting of the first linkage member and the second linkage member in the first direction, and
  - the actuating member including:
    - a piston, and
    - a sensor device disposed proximate to the piston, the sensor device being configured to detect an amount of extension or retraction of the piston so that a distance by which the platform moves is controllable based on the amount of extension or retraction.

18. The cold planer machine of claim 17, further comprising a cutting drum,
wherein the platform is movable relative to the cutting drum during pivoting of the first linkage member and the second linkage member in the first direction.

19. The cold planer machine of claim 17, further comprising:
- a support member provided on the frame; and
- a groove provided in the platform, the groove being configured to engage the support member for supporting the platform over the frame.

20. The cold planer machine of claim 17, wherein the actuating member includes a hydraulic cylinder.

* * * * *